US011872545B2

(12) United States Patent
Nagy et al.

(10) Patent No.: US 11,872,545 B2
(45) Date of Patent: Jan. 16, 2024

(54) COMPOSITE CATALYST FOR POLYOLEFIN DEPOLYMERIZATION

(71) Applicant: Basell Poliolefine Italia S.r.l., Milan (IT)

(72) Inventors: Sandor Nagy, Seabrook, TX (US); Daniel F. White, Houston, TX (US); Christopher D. Smith, Kingwood, TX (US); David L. Ramage, Friendswood, TX (US); Diego Brita, Ferrara (IT); Noel C. Hallinan, Loveland, OH (US)

(73) Assignee: Basell Poliolefine Italia Srl, Milan (IT)

( * ) Notice: Subject to any disclaimer, the term of this patent is extended or adjusted under 35 U.S.C. 154(b) by 20 days.

(21) Appl. No.: 17/541,474

(22) Filed: Dec. 3, 2021

(65) Prior Publication Data

US 2022/0176358 A1 Jun. 9, 2022

Related U.S. Application Data

(60) Provisional application No. 63/122,218, filed on Dec. 7, 2020.

(51) Int. Cl.
| | |
|---|---|
| *B01J 29/08* | (2006.01) |
| *B01J 29/70* | (2006.01) |
| *B01J 27/16* | (2006.01) |
| *B01J 29/40* | (2006.01) |
| *C08J 11/16* | (2006.01) |

(52) U.S. Cl.
CPC .......... *B01J 29/7007* (2013.01); *B01J 27/16* (2013.01); *B01J 29/084* (2013.01); *B01J 29/40* (2013.01); *C08J 11/16* (2013.01); *C08J 2323/06* (2013.01); *C08J 2323/12* (2013.01)

(58) Field of Classification Search
CPC ... B01J 21/04; B01J 21/16; B01J 27/16; B01J 27/18; B01J 27/232; B01J 27/1802; B01J 29/084; B01J 29/08; B01J 29/088; B01J 29/085; B01J 29/40; B01J 29/405; B01J 29/7007; B01J 29/7057; B01J 29/80; B01J 2229/20; B01J 2229/42; B01J 35/02; B01J 35/0006; B01J 37/0018; B01J 37/28; Y02P 20/52; C08J 11/16; C08J 2323/06; C08J 2323/12; Y02W 30/62; C10G 1/086
USPC ....... 502/60, 63, 64, 67, 69, 73, 77, 79, 208
See application file for complete search history.

(56) References Cited

U.S. PATENT DOCUMENTS

| | | | | |
|---|---|---|---|---|
| 3,403,110 A | * | 9/1968 | Sanborn | B01J 29/061 |
| | | | | 502/66 |
| 4,944,864 A | * | 7/1990 | Kugler | B01J 29/084 |
| | | | | 208/120.25 |
| 5,259,949 A | * | 11/1993 | Harris | B01J 29/166 |
| | | | | 208/120.25 |
| 9,254,480 B2 | * | 2/2016 | Kato | B01J 35/0006 |
| 2007/0131585 A1 | | 6/2007 | Koch | |

FOREIGN PATENT DOCUMENTS

JP          H1190226 A     4/1999

OTHER PUBLICATIONS

Fekhar B. et al.:Value Added Hydrocarbons Obtained by Pyrolysis of Contaminated Waste Plastics in Horizontal Tubular Reactor: In situ Updgrading of the Products by Chlorine Capture, Journal of Cleaner Production, Elsevier, Amsterdam, NL, vol. 241, Aug. 26, 2019 (Aug. 26, 2019), XP085852859, ISSN: 0959-6526, DOI: 10.1016/J.JCLEPRO.2019.118166.
Fekhar B. et al.: Thermo-Catalytic Co-Pyrolysis of Waste Plastic and Paper in Batch and Tubular Reactors for In-situ Product Improvement, Journal of Environmental Management, Elsevier, Amsterdam, NL, vol. 269, May 22, 2020 (May 22, 2020), XP086189383, ISSN:0301-4797, DOI:10.1016/JJ.JENVMAN.2020. 110741.
Fekhar B. et al.: Pyrolysis of Chlorine Contaminated Municipal Plastic Waste: In-situ Upgrading of Pyrolysis Oils by Ni/ZSM-5, Ni/SAPO-11, Red Mud and Ca(OH)2 Containing Catalysts, Journal of the Energy Institute, vol. 92, No. 5, Oct. 21, 2018 (Oct. 21, 2018), pp. 1270-1283, XP055920904, ISSN:1743-9671, DOI:10.1016/J. JOEL.2018.10.007.
Sano T. et al.:Improvement of Catalyst Stability of ZSM-5 Zeolite Containing Calcium by Modification with CaCO3, Applied Catalysis, vol. 33, No. 1, Aug. 15, 1987 (Aug. 15, 1987), pp. 209-217, XP055922323, NL, ISSN:0166-9834, DOI:10.1016/S0166-9834(00)80593-X.
Perkins Greg et al.: Recent Advances in Liquefaction Technologies for Production of Liquid Hydrocarbon Fuels from Biomass and Carbonaceous Wastes, Renewable and Sustainable Energy Reviews, Elseviers Science, New York, NY, US, vol. 115, Sep. 26, 2019 (Sep. 26, 2019), XP085890198, ISSN:1364-0321, DOI:10.1016/J.RSER. 2019.109400.
Gu Minyan et al.: Reaction Route Selection for Cellulose Hydrogenolysis into C2/C3 Glycols by ZnO-Modified Ni—W/[beta]-Zeolite Catalysts, Scientific Reports, vol. 9, 11398, No. 1, Aug. 16, 2019 (Aug. 16, 2019), XP05509359, DOI:10.1038/s41598-019-48103-6, Retrieved from the Internet: URL:https://www.nature.com/articles/s41598-019-48103-6.pdf.
The International Search Report and The Written Opinion for PCT/EP2021/084260 dated Jun. 29, 2022.

* cited by examiner

*Primary Examiner* — Elizabeth D Wood

(57) ABSTRACT

Catalytic compositions for depolymerizing polyolefin-based waste material into useful petrochemical products and methods of use are described. The compositions are a composite of at least one zeolite catalyst with one or more co-catalyst (s) that is a solid inorganic material. These composite catalysts, along with heat, are used to both increase the depolymerization reaction rate of the feed streams and suppress poisoning effects of non-polyolefin polymers that may be present. This results in a shorter residence time in the depolymerization unit and more efficient process.

17 Claims, 2 Drawing Sheets

COMPOSITE CATALYST FOR POLYOLEFIN DEPOLYMERIZATION

PRIOR RELATED APPLICATIONS

This application claims the benefit of priority to U.S. Provisional Patent Application No. 63/122,218, filed on Dec. 7, 2020, which is incorporated herein by reference in its entirely.

FEDERALLY SPONSORED RESEARCH STATEMENT

Not applicable.

REFERENCE TO MICROFICHE APPENDIX

Not applicable.

FIELD OF THE DISCLOSURE

The disclosure relates to catalytic compositions for depolymerizing polyolefin-rich plastic waste material to form useful petrochemical products.

BACKGROUND OF THE DISCLOSURE

Heightened standards of living and increased urbanization have led to an increased demand for polymer products, particularly polyolefin plastics. Polyolefins have been frequently used in commercial plastics applications because of their outstanding performance and cost characteristics. Polyethylene (PE), for example, has become one of the most widely used and recognized polyolefins because it is strong, extremely tough, and very durable. This allows for it to be highly engineered for a variety of applications. Similarly, polypropylene (PP) is mechanically rugged yet flexible, is heat resistant, and is resistant to many chemical solvents like bases and acids. Thus, it is ideal for various end-use industries, mainly for packaging and labeling, textiles, plastic parts and reusable containers of various types.

The downside to the demand for polyolefin plastics is the increase in waste. Post-consumer plastic waste typically ends up in landfills, with about 12% being incinerated and about 9% being diverted to recycling. In landfills, most plastics do not degrade quickly, becoming a major source of waste that overburdens the landfill. Incineration is also not an ideal solution to treating the plastic wastes as incineration leads to the formation of carbon dioxide and other greenhouse gas emissions. As such, there has been much interest in developing methods of recycling plastic waste to reduce the burden on landfills while being environmentally friendly.

A drawback to the recycling of plastic wastes is the difficulty in successfully producing commercially usable or desirable products. Plastic waste recycling currently includes washing the material and mechanically reprocessing it; however, the resulting pellets remain contaminated with food residue, dyes, and perfume. These contaminants render the pellets undesirable for most uses based on both performance and appearance. Further, it is difficult to obtain a pure stream of any particular polymer, resulting in a mixed plastic waste stream that may not have the desired properties post-recycling.

Recent advances have focused on converting polyolefin plastic waste to useable products like fuel sources or commercially important raw material. Methods of performing pyrolysis of the plastic waste stream followed by catalytic depolymerization have been developed to generate various products: gases, gasoline fractions, kerosene fractions, diesel fractions and waxes. Unfortunately, the catalysts themselves tend to be easily poisoned by other chemicals in the polyolefin waste feed, resulting in processes that are costly and time-consuming because they require a lot of energy to fully decompose polyolefin wastes to useful classes of products.

Despite the advances made in recycling polyolefins, there is a continued need for the development of a robust process for the conversion of polyolefin-rich waste feeds to useful petrochemical products. Ideally, these processes will overcome 'poisoning' from other polymers and contaminants that may be present in the waste feed.

SUMMARY OF THE DISCLOSURE

The present disclosure provides novel compositions and methods for thermally depolymerizing polyolefin-based material in the absence of oxygen. The presently disclosed compositions are composites of multiple catalysts that have a synergistic effect for increasing the rate of the depolymerization reactions while also suppressing any poisoning effects from non-polyolefin components (NPC) that may be present in the feed stream, or from degradation products of the non-polyolefin components. Specifically, a zeolite catalyst is mixed with at least one solid inorganic co-catalyst to form a robust depolymerization composite catalyst. This robust depolymerization composite catalyst is then mixed with a polyolefin-based waste material in a depolymerization unit and heated in the absence of oxygen in a process called thermolysis to quickly generate useful petrochemical products.

In more detail, zeolites have found use in catalytic cracking of polyolefin waste. The zeolite initiates a cationic unzipping of the polyolefins that proceeds at a faster rate (and smaller depolymerization half time) than depolymerization reactions proceeding without the zeolite, and often at lower temperatures. However, the zeolite's catalytic abilities can be suppressed by non-polyolefin components that may be present in the feed stream or by the non-polyolefin components' degradation products generated during the depolymerization process. In particular, non-polyolefin components such as polymers with nitrogen or high oxygen content, including polyamides, polyurethanes, cellulose and lignin, are known to form degradation products that 'poison' the zeolite's catalytic abilities. Alternatively, nitrogen-containing pigments used in consumer products may poison' the zeolite's catalytic abilities. These products may not render the catalyst inactive so much as they interfere with the mechanism of depolymerization, thus slowing the rate. Depending on the type and concentration of the zeolites and non-polyolefin components, the rate of depolymerization can be reduced by up to 85%, or higher depending on the level of undesirable components. As such, the amount of energy and time to depolymerize a polyolefin using a zeolite is increased by the presence of a non-polyolefin component.

A novel composite catalyst that combines at least one zeolite with at least one solid inorganic co-catalyst is disclosed. This composite catalyst addresses the effects of non-polyolefin components on zeolites during the thermolysis reaction, wherein the co-catalyst is able to restore the zeolites' catalytic ability. However, it was also found that the components of the composite catalyst have a synergistic effect for increasing the rate of the depolymerization reactions of polyolefins even when a zeolite-suppressing component or degradation product is not present in the feed stream. This results in a faster depolymerization reaction than depolymerization reactions without the composite catalyst or with just the zeolite alone. The liquid depolymerization products can then be used as is, or undergo further processing in e.g. olefins crackers, as an alternative feedstock.

The composite catalyst and methods described herein can be used to treat any polyolefin material, including post-industrial waste and post-consumer use, and can include mixed polyolefin/non-polyolefin streams. Treatment of post-consumer polyolefin waste is of particular importance due to the overburdening of landfills and the potential to generate raw materials from the wastes. The methods described here relate to the processing of post-consumer waste after it has been sorted by the processing center at a landfill, or other recycling center, to separate polyolefin-based materials from other recyclable materials such as glass or metal. However, complete removal of non-polyolefin polymers such as cellulose (paper), polyvinyl polymers, nylons, and the like are not required due to the abilities of the solid inorganic co-catalyst(s) to suppress any negative effects these non-polyolefin components and/or their degradation products may have on the zeolite.

The present disclosure includes any of the following embodiments in any combination(s):

A composite catalyst for depolymerizing polymers, comprising at least one zeolite and at least one solid inorganic co-catalyst.

A method of depolymerizing polymers comprising adding a polyolefin-based feed stream and a composite catalyst to a reactor heated to a temperature between about 200 and about 600° C., wherein the composite catalyst comprises at least one zeolite and at least one solid inorganic co-catalyst; and reacting the polyolefin-based feed stream with the composite catalyst to depolymerize the polyolefin-based feed stream.

A method of depolymerizing polymers comprising: adding a polyolefin-based feed stream and a composite catalyst to a reactor heated to a temperature between about 200 and about 600° C., wherein the composite catalyst comprises at least one zeolite and at least one solid inorganic co-catalyst, wherein the polyolefin-based feed stream has up to 10 wt. % of a non-polyolefin component; and reacting the polyolefin-based feed stream with the composite catalyst to depolymerize the polyolefin-based feed stream.

A method of depolymerizing polymers comprising adding a polyolefin-based feed stream and a composite catalyst to a reactor heated to a temperature between about 200 and about 600° C., wherein the composite catalyst comprises at least one zeolite and at least one solid inorganic co-catalyst; and reacting the polyolefin-based feed stream with the composite catalyst to depolymerize the polyolefin-based feed stream, wherein the rate of depolymerization of the polyolefin-based feed stream is at least 10% higher than the rate of depolymerization for the polyolefin-based feed stream without the composite catalyst.

A method of depolymerizing polymers comprising: adding a polyolefin-based feed stream and a composite catalyst to a reactor heated to a temperature between about 200 and about 600° C., wherein the composite catalyst comprises at least one zeolite and at least one solid inorganic co-catalyst, wherein the polyolefin-based feed stream has up to 10 wt. % of a non-polyolefin component; and reacting the polyolefin-based feed stream with the composite catalyst to depolymerize the polyolefin-based feed stream, wherein the rate of depolymerization of the polyolefin-based feed stream is at least 10% higher than the rate of depolymerization for the polyolefin-based feed stream without the composite catalyst.

Any of the compositions or methods described herein, wherein the solid inorganic co-catalyst is a metal oxide, metal hydroxide, metal carbonate, silicate or tetravalent metal phosphates.

Any of the compositions or methods described herein, wherein the least one solid inorganic co-catalyst is selected from a group consisting of $Ca(OH)_2$, $Mg(OH)_2$, $Ba(OH)_2$, $Sr(OH)_2$, $CaO$, $Al_2O_3$, and $Zr(HPO_4)_2$.

Any of the compositions or methods described herein, wherein the total amount of solid inorganic co-catalyst is about 20 to about 90 wt. % of the composite catalyst.

Any of the compositions or methods described herein, wherein said at least one zeolite is chosen from a group consisting of Beta zeolite, Zeolite Socony Mobil-5 (ZSM-5), ultra stable zeolite Y, zeolite Y, or combinations thereof. In some embodiments, H-ultra stable zeolite Y is used.

Any of the compositions or methods described herein, wherein the composite catalyst comprises Beta zeolite, ZSM-5 zeolite, zeolite Y, $Ca(OH)_2$, and $Al_2O_3$.

Any of the compositions or methods described herein, wherein the composite catalyst comprises Beta zeolite and $Ca(OH)_2$.

Any of the compositions or methods described herein, wherein the composite catalyst is present in an amount of greater than 0 to about 20 wt. % of the polyolefin-based feed stream.

Any of the compositions or methods described herein, wherein the polyolefin-based feed stream is a low-density polyethylene, a high density polyethylene, a polypropylene, or a combination thereof.

Any of the compositions or methods described herein, wherein the polyolefin-based feed stream has up to 10% of at least one non-polyolefin component.

Any of the compositions or methods described herein, wherein the at least one non-polyolefin component is a pigment having at least one nitrogen atom.

Any of the compositions or methods described herein, wherein the at least one non-polyolefin component is a polymer that has a high oxygen content, nitrogen-containing moieties, or both. In some embodiments, the polymer is selected from a group comprising nylon polymers, cellulose, polyaramids, polyurethanes, and polyvinyl polymers.

Any of the compositions or methods described herein, wherein the polyolefin-based feed stream is post-consumer waste or post-industrial waste.

Any of the compositions or methods described herein, wherein the polyolefin-based feed stream comprises both post-industrial waste and post-consumer waste.

This summary is provided to introduce a selection of concepts that are further described below in the detailed description. This summary is not intended to identify key or essential features of the claimed subject matter, nor is it intended to be used as an aid in limiting the scope of the claimed subject matter.

DEFINITIONS

Figure 1A:
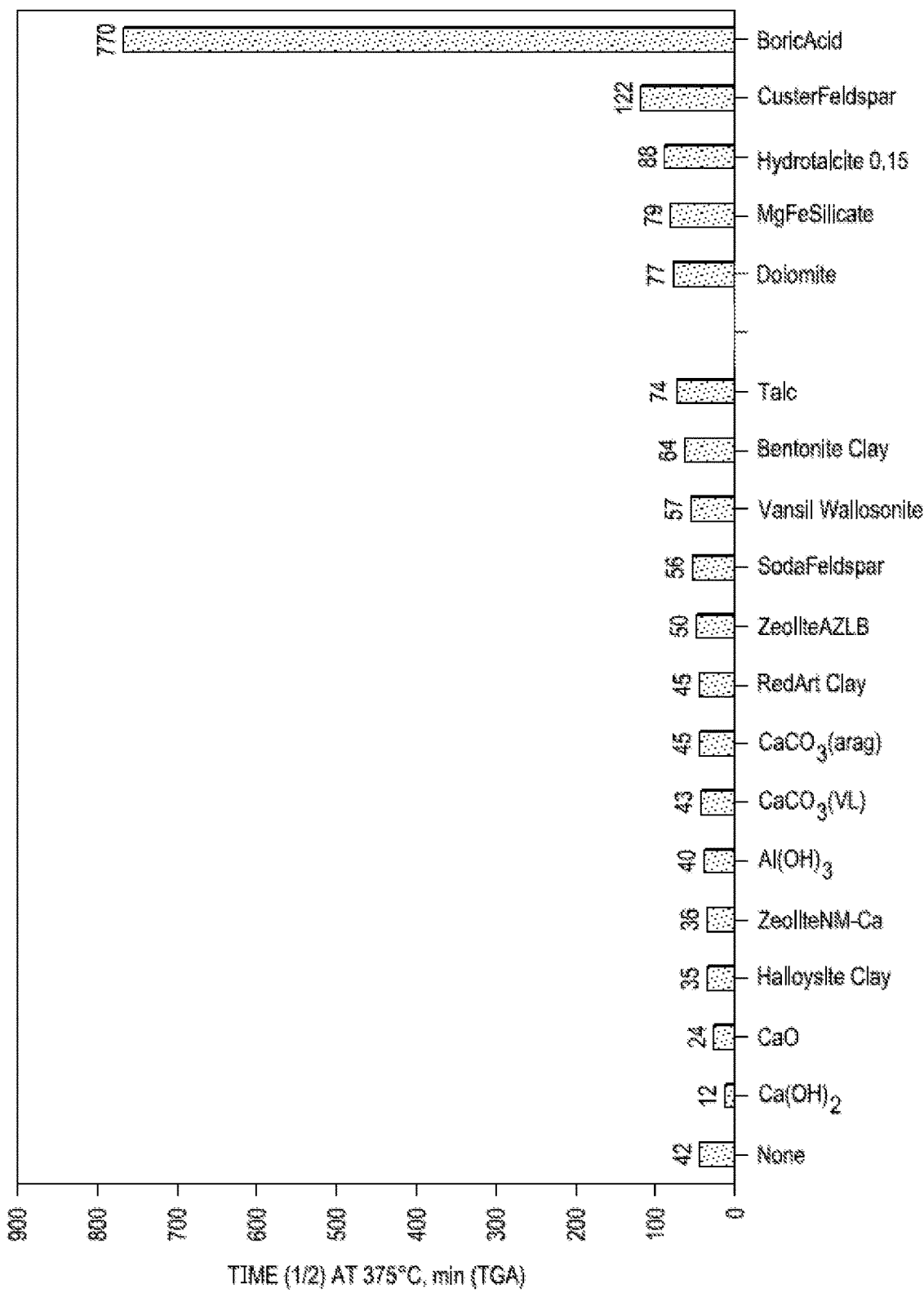
FIGS. 1A-1B. Depolymerization half time for a HDPE feed stream with 3 wt. % cellulose using composite catalysts having Beta zeolite (1A) and ZSM-5 zeolite (1B) mixed with different solid inorganic co-catalysts.

As used herein, "residence time" refers to the time needed to depolymerize a batch of polymer waste in a depolymerization unit.

As used herein, the terms "depolymerization half time" or "half time of depolymerization" refer to the time needed to achieve a 50% loss of mass of a sample at a specific temperature during a TGA thermolysis reactions. The depolymerization half time is related to the residence time that would be needed for large scale industrial depolymerization reactors.

As used herein, "thermolysis" refers to a thermal depolymerization reaction occurring in the absence of oxygen.

The term "pure" as used in reference to the feed stream refers to a feed that is 100% polyolefin, but does not mean that the feed contains only one type of polyolefin. Rather, a "pure" feed stream can have a mixture of polyolefins such as low-density polyethylene, high density polyethylene, polypropylene and combinations thereof.

The terms "polyolefin-based" and "polyolefin-rich", in reference to materials, feed streams, or waste streams, are used interchangeable to refer to a mixture that is at least 80% polyolefin.

As used herein, "non-polyolefin components" refers to material present in a polyolefin-based feed, or waste, stream that can reduce the abilities of a zeolite to catalyze the depolymerization of the polyolefins that are present in the stream. Examples of non-polyolefin components include non-polyolefinic polymers with high oxygen and/or nitrogen content.

As used herein, "post-consumer waste" refers to a type of waste produced by the end consumer of a material stream.

As used herein, "post-industrial waste" refers to a type of waste produced during the production process of a product.

As used herein, "feed stream" refers to a supply of polyolefin-based material for depolymerization. Depending on the depolymerization unit, the feed stream can be a continuous supply of material or a batch of material. The feed stream can be pure polyolefins or can be a mix of polyolefins with non-polyolefin components.

A "waste stream" is a type of feed stream comprising material that has been discarded as no longer useful, including but not limited to, post-consumer and post-industrial waste.

As used herein, the terms "poisoning" and "catalyst poisoning" refer to the partial or total deactivation of a zeolite catalyst by at least one non-polyolefin component in the feed stream being treated.

As used herein, the terms "zeolite" or "zeolite catalyst" refers to a wide variety of both natural and synthetic aluminosilicate crystalline solids whose rigid structure comprise networks of silicon and aluminum atoms that are tetrahedrally coordinated with each other through shared oxygen atoms. This rigid framework contains channels or interconnected voids that can be occupied by cations, such as sodium, potassium, ammonium, hydrogen, magnesium, calcium, and water molecules. The zeolites used herein have a high silica content (Si/Al ratio greater than 5) which not only allows the zeolite's structural framework to withstand the high temperatures used in the degradation process but also increases the total acidity of the zeolites. Many of the zeolites in the present disclosure are used in H-form to ensure the presence of strong acidic sites.

All concentrations herein are by weight percent ("wt. %") unless otherwise specified.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention.

The following abbreviations are used herein:

| ABBREVIATION | TERM |
| --- | --- |
| beta | Beta (or BEA) zeolite |
| EVA | ethylene vinyl acetate |
| EVOH | ethylene vinyl alcohol |
| H-USY | H-ultra stable zeolite Y |
| HDPE | High density polyethylene |
| LDPE | Low-density polyethylene |
| MPO | Municipal polyolefin waste |
| NPC | Non-polyolefin component |
| PE | polyethylene |
| PET | Poly(ethylene terephthalate) |
| PP | polypropylene |
| TGA | Thermogravimetric Gravimetric Analysis |
| USY | Ultra stable zeolite Y |
| vol. % | volume percent |
| wt. % | weight percent |
| ZSM-5 | Zeolite Socony Mobil-5 |

DESCRIPTION OF EMBODIMENTS OF THE DISCLOSURE

The present disclosure provides catalytic compositions for recycling polyolefin-based materials into commercially important raw material. Specifically, at least one zeolite is mixed with at least one solid inorganic co-catalyst to form a composite catalyst for depolymerizing a polyolefin-based feed stream in a depolymerization unit. The components of the composite catalyst work synergistically to increase the rate of depolymerization, thus reducing the amount of time the polyolefin-based feed stream spends in the depolymerization unit. The improvement in the rate of depolymerization occurs even in the presence of non-polyolefin components in the feed stream that can reduce the catalytic activity of the zeolite in the absence of the solid inorganic co-catalyst.

Zeolites are solid acid catalysts with an open, three-dimensional crystal structure with many pores and acidic active sites where chemical reactions such as the thermal depolymerization of polyolefins can take place. The depolymerization proceeds via the production of the intermediate carbenium ion by hydrogen transfer reactions initiated by the zeolites' acid sites and subsequent unzipping. Essentially, zeolites rely on strongly acidic sites to crack the polyolefins. This cracking process begins on the surface of the zeolite, because the polymer needs to be broken into smaller molecules before entering the internal voids of these solids, due to the small size of their openings. This leads to more contact between the polyolefin and the catalyst, resulting in a faster rate of depolymerization and a shorter residence time in the depolymerization unit.

Zeolites have many advantages for depolymerizing polyolefins including the ability to adjust the acidity and void sizes to address specific feed stream characteristics. Additionally, zeolites are heterogeneous catalyst, allowing for easy separation and reusability from the depolymerization products.

Zeolites catalyst, however, are susceptible to poisoning and reduced catalytic activity in the presence of non-polyolefin components such as polymers with nitrogen-containing groups and/or high oxygen content, and/or their depolymerization products such as furfural. Additionally, many of the substrates with high oxygen and nitrogen content can form coke deposits on zeolites, further reducing the zeolites' activity. Feed streams of polyolefin wastes are rarely pure, even after multiple separation steps in recycling facilities, and a small addition of a non-polyolefin component can suppress the zeolites' catalytic abilities and decrease its depolymerization rate by as much as 85%.

The present compositions and methods overcome these issues by combining at least one zeolite with a solid inorganic co-catalyst that is able to suppress poisoning effects from a non-polyolefin component in polyolefin-based feed streams and restore the zeolite's ability to crack the polyolefins. In addition to reducing and/or preventing zeolite suppression by a non-polyolefin component, the solid inorganic co-catalyst(s) unexpectedly works synergistically with the zeolite(s) to improve the depolymerization rate of a pure or unpure polyolefin stream to a greater extent than the zeolite alone. The co-catalyst must be, and remain, solid, because a liquid co-catalyst will kill the zeolite catalyst.

In more detail, the composite catalyst comprises at least one zeolite and at least one solid inorganic co-catalyst. Any zeolite catalyst that is capable of catalyzing the depolymerization reaction of polyolefins can be used in the composite catalyst. In some embodiments, the composite catalyst includes commercially available zeolites including but not limited to, beta zeolite (beta), Zeolite Socony Mobil-5 (ZSM-5), zeolite Y (Y), ultra stable zeolite Y (USY), amorphous acidic AlSiOx such as Siral® 40, or combinations thereof. Combinations of zeolites may be useful to address specific polyolefin-based feed content or can be used to offset costs associated with using only an expensive zeolite in the composite.

The solid inorganic co-catalyst in the present composite catalyst is an inorganic material that has an acidic or a basic character, and can be a silicate, an aluminosilicate, a carbonate, phosphate, oxide or a hydroxide. As mentioned above, zeolites rely on strongly acidic sites to initiate the depolymerization of polyolefins. As such, acidic co-catalyst compounds can be used as co-catalyst without affecting the zeolite's initiation method. Unexpectedly, however, it was found that basic co-catalyst compounds can also be used without neutralizing the zeolite's acidic sites or affecting its ability to crack the polyolefins. Bases such as $Ca(OH)_2$ have been used to protect reactors from corrosion when depolymerizing plastics with acid content, such as polyvinyl chloride. However, they have not been used to catalyze a depolymerization reaction, much less combined with zeolites.

In some embodiments, the solid inorganic co-catalyst is a metal oxide or metal hydroxide. Any known metal oxide or metal hydroxide can be used, including those containing metals from Groups 2-8 and 11-16, as well as the lanthanoids and actinoids. Exemplary solid inorganic co-catalyst include $Ca(OH)_2$, $Mg(OH)_2$, $Ba(OH)_2$, $Sr(OH)_2$, NaOH, KOH, CaO, and $Al_2O_3$. Alternatively, tetravalent metal phosphates $(M(HPO_4)_2)$ can also be used, wherein M is Zr, Ti, or Sn, as well a hydrophosphates. Any combination of the solid inorganic co-catalysts can be used. In some embodiments, the composite catalyst has both $Al_2O_3$ and $Ca(OH)_2$.

The amount of solid inorganic co-catalyst(s) in the composite catalyst will depend on the content of the polyolefin feed, as well as the types of non-polyolefin components, if any, and the amount thereof in the feed stream. In some embodiments, the total amount of solid inorganic co-catalysts is between about 20 wt. % to about 90 wt. % of the composite catalyst, with the remaining balance being the total amount of zeolites. In other embodiments, the total amount of solid inorganic co-catalysts is between about 20 wt. % to about 60 wt. % of the composite catalyst; alternatively, the total amount of solid inorganic co-catalysts is between about 40 wt. % to about 75 wt. % of the composite catalyst; alternatively the total amount of solid inorganic co-catalysts is between about 70 wt. % to about 90 wt. % of the composite catalyst; alternatively the total amount of solid inorganic co-catalysts is between about 50 wt. % to about 75 wt. % of the composite catalyst.

In some embodiment of the present disclosure, the composite catalyst is a combination of Beta zeolite with $Ca(OH)_2$, $Mg(OH)_2$, $Ba(OH)_2$, $Sr(OH)_2$, CaO, $Al_2O_3$, or $Zr(HPO_4)_2$, wherein the Beta zeolite is present in an amount between about 25 to about 50 wt. % of the composite catalyst. Alternatively, the composite catalyst is a combination of ZSM-5 with $Ca(OH)_2$, $Mg(OH)_2$, $Ba(OH)_2$, $Sr(OH)_2$, CaO, $Al_2O_3$, or $Zr(HPO_4)_2$, wherein the ZSM-5 is present in an amount between about 25 to about 50 wt. % of the composite catalyst. In yet more of the embodiments present disclosure, the composite catalyst has Beta zeolite, ZSM-5, or combinations thereof, mixed with $Ca(OH)_2$, $Mg(OH)_2$, $Ba(OH)_2$, $Sr(OH)_2$, CaO, $Al_2O_3$, or $Zr(HPO_4)_2$, wherein the total amount of zeolite present is in an amount between about 25 to about 50 wt. % of the composite catalyst.

The presently described composite catalysts can be used to thermally degrade or depolymerize a feed stream comprising material with a single polyolefin component or a mixture of polyolefin components in any amount. Any polyolefin can be present in the feed stream, including but not limited to, polyethylene (both high and low density), polypropylene, ethylene-propylene copolymers, polybutene-1, polyisobutene, and copolymers thereof. Further, the feed stream is not limited to any particular form so films, foams, textiles or other shaped material can be treated with the described methods. The polyolefins can be obtained from waste streams, including post-consumer waste streams, post-industrial waste streams, or combinations thereof.

In some embodiments, the feed stream further comprises one or more non-polyolefin components that decrease the catalytic activity of a zeolite. Alternatively, the feed stream may further comprise one or more non-polyolefin components that generate degradation products that decrease the catalytic activity of a zeolite. While many chemicals fall into this category, non-polyolefin polymers are most likely to be present in polyolefin-based feed streams, particularly where the feed stream is a waste stream. In particular, non-polyolefin polymers with nitrogen or high oxygen content such as polyamids, acrylates, nylons, polyurethanes, cellulose and polyvinyl polymers may be present in the feed stream. These polymers are commonly found at waste sites and are difficult to completely separate from polyolefins. Many of these polymers degrade into problematic products that are capable of reducing the zeolite's catalytic abilities, such as furfural, caprolactam, various amines, phenols, and esters. Alternatively, non-polyolefin components such as pigments containing nitrogen may be present in polyolefin-based waste stream and able to decrease the catalytic activity of a zeolite.

The polyolefin-based feed stream is combined with the composite catalyst, and optional additives, in a depolymerization unit, where it will undergo thermal depolymerization reactions catalyzed by the composite catalyst. The operational temperature of the depolymerization units is between about 200 and about 600° C. Alternatively, the temperature of the depolymerization unit is between about 225 and about 500° C. In yet another alternative, the temperature of the depolymerization unit is between about 250 and about 450° C. The polyolefin-based feed stream can be treated in batches in the depolymerization unit due to the residence time needed to fully depolymerize the feed stream. The estimated residence time for each batch will be between about 30 to about 300 minutes, depending on the design of the depolymerization unit. Alternatively, the estimated residence time is about 60 minutes.

The amount of composite catalyst used in the present methods can be limited by the requirements of the depolymerization unit. The composite catalyst is a solid that contributes to the dead volume in the unit during the depolymerization reaction. The lower the dead volume, the more polymer that can be depolymerized. In some depolymerization units, the amount of dead volume is limited to 20 vol. % or less. As such, the amounts of the composite catalyst in some embodiments of the present methods are less than 20 vol. % of the depolymerization unit; alternatively, the amount of composite catalyst is between greater than 0 and 10 vol. % of the depolymerization unit; alternatively, the amount of composite catalyst is between greater than 8 and 17 vol. % of the depolymerization unit; alternatively, the amount of composite catalyst is between greater than 13 and 20 vol. % of the depolymerization unit. In some embodiments, the depolymerization units allow a minimal volume of solids (<3 vol. %).

Depending on the type of depolymerization unit, optional additives such as sand may be added to the polyolefin-based feed stream and composite catalyst mixture. Some of these optional additives may contribute to the dead volume of the depolymerization unit, further limiting the amount of the composite catalyst. As an example, a screw kiln depolymerization reactor uses sand as a heat conductor, which limits the amount of dead volume available for the composite catalyst.

In some embodiments, the composite catalyst is present in an amount of 20% or less by weight of the batch polyolefin-based feed stream. Alternatively, the amount of the composite catalyst is between >0 and 5% by weight of the batch polyolefin feed stream. In yet another alternative, the composite catalyst is present in an amount of 2% or 2.5% by weight of the batch polyolefin feed stream. In some embodiments, the amount of the composite catalyst is between 10 and 15% by weight of the batch polyolefin feed stream.

The presently disclosed composite catalysts and methods of using them to depolymerize polyolefin-based feed streams are exemplified with respect to the examples below. These examples are included to demonstrate embodiments of the appended claims. However, these are exemplary only, and the invention can be broadly applied to any combination of polyolefin-based feed, with and without non-polyolefin components, and composite catalyst. Those of skill in the art should appreciate that many changes can be made in the specific embodiments which are disclosed and still obtain a like or similar result without departing from the spirit and scope of the disclosure herein. In no way should the following examples be read to limit, or to define, the scope of the appended claims.

EXAMPLES

A variety of polyolefin-based feed materials were combined with a composite catalyst in a depolymerization unit, depolymerized, and analyzed per the described methods to evaluate the ability of the composite catalyst to catalyze the depolymerization of the polyolefin-based composition.

Unless other noted, the depolymerization unit was a Thermogravimetric Gravimetric Analysis (TGA) instrument. For the TGA thermolysis reactions, the uniform samples were heated under nitrogen at 10K/min to a depolymerization temperature of 375° C. in a Mettler Toledo TGA/DSC 3+ (Mettler Toledo, Columbus, Ohio) and held for 1 hour. The depolymerization half time at a specific temperature, defined as the time needed to achieve a 50% loss of mass, was recorded directly if the value was less than 60 min, or determined under the assumption of first order decomposition kinetics as $t_{1/2}=0.693/k$, where k is the first order rate constant determined graphically using a $Ln(C_0/C)$ vs time plot.

The depolymerization half time is related to the residence time needed in a large scale depolymerization unit. The shorter the half time, the shorter the residence time for a batch of a polymer feed in a depolymerization unit, and the faster the depolymerization rate k.

Example 1: Co-Catalyst

The depolymerization of post-consumer polyolefin waste is complicated by the inability to obtain a polyolefin-only feed stream. Even if the waste undergoes multiple separation steps at the landfills or recycle centers, some amounts of non-polyolefin polymers may remain in the waste feed. Non-polyolefin polymers can interfere with catalysts that are commonly used to depolymerize polyolefins, such as zeolites. As mentioned above, polymers with nitrogen or high oxygen content such as aramids, acrylates, polyurethanes, cellulose and polyvinyl polymers are known to 'poison' the zeolite's catalytic abilities. An initial series of samples were prepared to evaluate if a solid inorganic co-catalyst could be combined with a zeolite to improve the zeolite's catalytic abilities to degrade a mixed polyolefin-based feed.

A mixed polyolefin-based feed comprising high density polyethylene (HDPE) (grade ACP9255, a LyondellBasell product) with 3 wt. % of cellulose (Sigma Aldrich), a high oxygen content polymer, was prepared. Cellulose is a common recyclable material frequently found in the form of paper or wood impurities in municipal plastic waste streams. Cellulose's high oxygen content results in it having a number of degradation products, such as furfural, that are able to decrease the catalytic abilities of zeolites, as shown below in Table 1. As little as 3 wt. % of cellulose could result in an increase the depolymerization half time by a factor of 14, compared to a pure HDPE feed stream.

TABLE 1

Depolymerization half time at 375° C. in a TGA

| Feed | $t_{1/2}$ (min) | k |
|---|---|---|
| HDPE only | 1733 | 0.0004 |
| HDPE with 3 wt. % Cellulose | >2000 | |

TABLE 1-continued

Depolymerization half time at 375° C. in a TGA

| Feed | $t_{1/2}$ (min) | k |
|---|---|---|
| HDPE only with Beta zeolite | 3 | 0.2018 |
| HDPE with 3 wt. % Cellulose and Beta zeolite | 42 | 0.0166 |

Figure 1B:
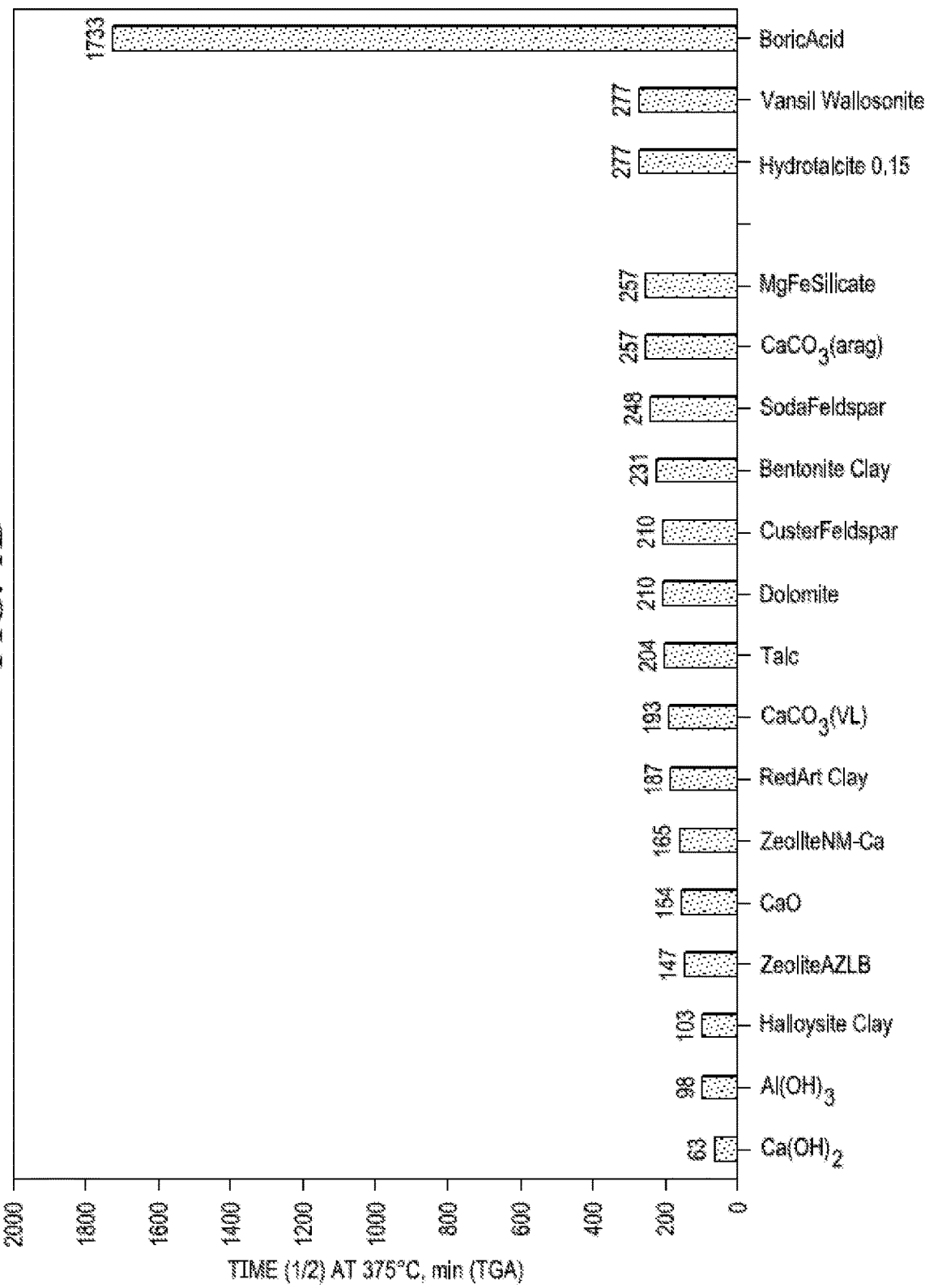

As such, zeolites used for polyolefin depolymerization were combined with a variety of solid components, shown on the x-axis in FIG. 1A (Beta zeolite, CP811E-75) and FIG. 1B (ZSM-5, CBV3014H) to determine if the solid component could act as a co-catalyst to offset any suppression that the cellulose has on the zeolites, and improve the degradation process.

Uniform samples were prepared by melt-compounding 4.7 g of the HDPE and 0.15 g of cellulose with 0.2 g of a composite catalyst in a HAAK MiniCTW compounder at 200° C. and 200 RPM for 5 minutes. The composite catalyst combined 0.15 g of the solid inorganic co-catalyst with 0.05 g of either Beta zeolite or ZSM-5. The uniform samples were heated under nitrogen at 10K/min to a depolymerization temperature of 375° C. and held for 1 hour.

The results for these initial reactions are shown in FIGS. 1A-B and Table 1. The depolymerization half time for the HDPE with no cellulose or catalyst is 1733 minutes. The addition of cellulose increases the depolymerization half time to over 2000 minutes. However, the addition of Beta zeolite decreases the depolymerization half time greatly to 3 minutes for HDPE only, and about 42 minutes for HDPE with 3 wt. % cellulose. The difference in depolymerization half time for these two samples is attributed to the cellulose's disruption of the Beta zeolite's catalytic abilities. Though not shown in Table 1, ZSM-5 zeolite (CBV3014H), a cheaper alternative to beta zeolite, also decreases the depolymerization half time of the HDPE and HPDE with 3 wt. % cellulose; however, the extent of this decrease is not a large as that observed with Beta zeolite.

A number of solid inorganic components were added to the beta zeolite and ZSM-5 zeolite, to evaluate their potential as a co-catalyst to further reduce the polymerization half time for the polyolefin-based compositions having 3 wt. % cellulose. As shown in FIG. 1A, the components with the largest improvements in the depolymerization half time were $Ca(OH)_2$, $Al_2O_3$ (acidic), CaO, acidic halloysite ($Al_2Si_2O_5(OH)$), and natural, non-acidic Zeolite NM-CA. In fact, CaO and $Ca(OH)_2$ decreased the depolymerization half time by about 43% and 71%, respectively, compared to Beta zeolite by itself. The remaining additives either did not decrease the depolymerization half time (talc, $CaCO_3$) to a greater extent than Beta zeolite alone, or only slightly changed the depolymerization half time ($Al(OH)_3$).

FIG. 1B shows a second set of results that used ZSM-5 as the zeolite. ZSM-5 zeolite is a cheaper alternative to beta zeolite, but as can be seen in FIG. 1B, composite catalysts with ZSM-5 do not increase the degradation rate of the current polyolefin-based feed stream to the same extent. However, all combinations resulted in faster depolymerizations than an uncatalyzed depolymerization reaction. The largest improvement in depolymerization half time was seen with the combination of ZSM-5 zeolite and $Ca(OH)_2$.

Further, FIG. 1A-1B also show how some solid inorganic material are better suited for different zeolites. For example, CaO had the second lowest depolymerization half time when combined with beta zeolite, but was the fifth lowest depolymerization half time when combined with a ZSM-5. As such, one might select either $Ca(OH)_2$ or $Al(OH)_3$ when using ZSM-5.

Improvements in depolymerization rate are desired to shorten the residence time, and thus reduce costs for polyolefin recycling. All of the compositions shown in FIGS. 1A-B were much faster (higher k values) than an uncatalyzed depolymerization reaction for the mixed polymer feed, which will reduce cost. For further cost savings, the composite catalyst can combine more expensive zeolites like Beta zeolite with a lower cost zeolites such as ZSM-5 zeolite or zeolite Y, without significantly increasing the residence time of the polyolefin-based waste in an industrial scale depolymerization unit above the abilities of beta zeolite by itself with a non-zeolite co-catalyst.

While all of the added components in the composite catalyst improved the depolymerization of this particular polymer feed, it was found that some potential co-catalysts were able to decrease the depolymerization half time by a greater extent than other components. For the purpose of this example, components that reduced the depolymerization half time by about 5% or more compared to Beta zeolite were considered "co-catalysts" for the present polymer feed mixture and optimized in later examples. However, the use of different polymer feed mixtures with different "poisons" could result in some or all of the alternative components in FIG. 1A reducing the depolymerization half time by 5% or more.

Further, components similar to those in FIGS. 1A-B are expected to also increase the depolymerization rate even though they were not included in the present example. For instance, $Ca(OH)_2$, also known as lime, was chosen for this example as it is was the most convenient metal hydroxide to procure. Nonetheless, other metal hydroxides such as KOH, $Mg(OH)_2$, $Ba(OH)_2$, and $Sr(OH)_2$ can be used as co-catalysts, too. However, all of these similar compounds may not improve the depolymerization rate to the same extent as $Ca(OH)_2$ for the current polyolefin-based feed. Specifically, they may not have the same activity for the same waste feeds, as depicted in Table 19 for a post-consumer waste stream.

As another example, KOH would not be a suitable co-catalyst for depolymerizing feeds having cellulose. Cellulose generates water as it breaks down, which would hydrolyze the KOH, rendering it a slush in the depolymerization unit, thus killing the zeolite. However, KOH could be used as a co-catalyst for polyolefin-based feeds that have non-polyolefin materials other than those that generate water. Nylon, for example, would not generate water.

The type of polyolefin was not expected to affect the abilities of the composite catalyst. Table 2 displays the depolymerization results for a LDPE (grade NA214, a LyondellBasell product) mixed with cellulose and a composite catalyst comprising a ZSM-5 zeolite and $Ca(OH)_2$. As before, the composite catalyst improved the depolymerization half time to a greater extent than either component of the composite by itself.

TABLE 2

Depolymerization half time at 400° C. for a LDPE/Cellulose feed

| Feed | | Composite Catalyst | | |
| --- | --- | --- | --- | --- |
| LDPE (g) | Cellulose (g) | ZSM-5- CBV3014H (g) | Ca(OH)$_2$ (g) | Depolymerization $t_{1/2}$ (min) |
| 4.5 | 0.5 | 0 | 0 | 198 |
| 4.5 | 0.5 | 0.125 | 0 | 34 |
| 4.5 | 0.5 | 0 | 0.25 | 161 |
| 4.5 | 0.5 | 0.125 | 0.25 | 14 |

Based on the results in Tables 1-2 and FIGS. 1A-B, further evaluations were performed using composite catalysts comprising CaO, Ca(OH)$_2$ and/or Al$_2$O$_3$ as solid inorganic co-catalysts alongside a zeolite. The results for these evaluations are shown below in Examples 2 and 3.

Example 2: Effect of Cellulose Concentration

For this example, compositions were prepared to evaluate the performance of composite catalysts comprising Beta zeolite with various amounts of Ca(OH)$_2$ and/or Al$_2$O$_3$ to depolymerize polyolefin-based compositions having different amounts of cellulose.

As before, the various samples were processed using TGA as the depolymerization unit, and samples were prepared by melt-compounding the HDPE and cellulose composition with the composite catalyst having a 1% Beta zeolite loading in a HAAK MiniCTW compounder at 200° C. and 200 RPM for 5 minutes. The samples were heated under nitrogen at 10K/min to a depolymerization temperature of 375° C. and held for 1 hour.

The compositions and their depolymerization half times are shown in Table 3.

TABLE 3

Depolymerization half time at 375° C. for composite catalyst having Ca(OH)$_2$ and/or activated alumina

| | | | | Depolymerization $t_{1/2}$ (min) | | | |
| --- | --- | --- | --- | --- | --- | --- | --- |
| | Composite catalyst | | | No Cellulose | 0.15 g of Cellulose* | 0.3 g of Cellulose‡ | 0.35 g of Cellulose$^a$ |
| Polyolefin HDPE (g) | BZ (g) | Ca(OH)$_2$ (g) | Al$_2$O$_3$ (g) | | | | |
| 4.7 | 0 | 0 | 0 | 1733 | | | |
| 4.7 | 0 | 0 | 0.15 | | 1733 | | |
| 4.7 | 0.05 | 0 | 0 | 3 | 42 | | |
| 4.7 | 0.05 | 0.15 | 0 | | 12 | 81 | |
| 4.7 | 0.05 | 0.30 | 0 | | 23 | 64 | |
| 4.7 | 0.05 | 0.45 | 0 | | 8 | 59 | |
| 4.7 | 0.05 | 0.50 | 0 | | 11 | 73 | |
| 4.7 | 0.05 | 0 | 0.15 | | 21 | 63 | 95 |
| 4.7 | 0.05 | 0 | 0.30 | | 15 | 56 | |
| 4.7 | 0.05 | 0 | 0.45 | | 12 | 43 | |
| 4.7 | 0.05 | 0 | 0.50 | | 11 | 30 | 53 |
| 4.7 | 0.05 | 0.15 | 0.15 | 2 | 13 | 82 | |
| 4.7 | 0.05 | 0.15 | 0.30 | 1 | 10 | 61 | |
| 4.7 | 0.05 | 0.30 | 0.15 | 2 | 9 | 69 | |
| 4.7 | 0.05 | 0.30 | 0.30 | 2 | 6 | 36 | |
| 4.7 | 0.1 | 0 | 0 | 8 | | | |
| 4.7 | 0.1 | 0 | 0.15 | 6 | | | |
| 4.7 | 0.15 | 0 | 0 | 5 | | | |
| 4.7 | 0.15 | 0 | 0.15 | 4 | | | |

BZ = Beta Zeolite
* = ~3 wt. %
‡ = ~6 wt. %
$a$ = ~7 wt. %

The results in Table 3 show that each composite catalyst was able to decrease the depolymerization half time compared to an un-catalyzed depolymerization, although increasing amounts of cellulose did increase the depolymerization half time and slow down the reaction rate. Unexpectedly, the composite catalysts with Al$_2$O$_3$ at increasing concentrations outperformed the composite catalysts with Ca(OH)$_2$. The composite catalysts with Ca(OH)$_2$ not only had a larger depolymerization half time, but the difference in the half time as the concentration of Ca(OH)$_2$ increased was about 10% for 3 wt. % cellulose. In contrast, the composite catalysts with Al$_2$O$_3$ has a lower depolymerization half time (63 minutes at 0.15 g compared to 81 minutes for 0.15 g Ca(OH)$_2$) and a much greater decrease in half time at larger concentrations. As the amount of Al$_2$O$_3$ increased to 0.5 g, the change in the depolymerization half time was about 50% for 3 wt. % cellulose.

For polyolefin-based feeds with 7 wt. % of cellulose, the depolymerization half time decreased by about 45% for the same range of Al$_2$O$_3$ concentrations, compared to a depolymerization half time decreased of about 55% for the same range of Al$_2$O$_3$ concentrations for 6 wt. % of cellulose.

Using a combination of both Ca(OH)$_2$ and Al$_2$O$_3$ in the composite catalyst did improve the depolymerization half time, but to a lesser extent than a composite catalyst with Beta zeolite and Al$_2$O$_3$ only.

Another surprising result was the improvement in the depolymerization half time for a HDPE only stream. Both of the solid inorganic co-catalysts had a synergistic effect with the Beta zeolite that allowed the composite catalyst to reduce the depolymerization half time of the HDPE only feed from 3 minutes (with beta zeolite as the only catalyst) to 1-2 minutes. This was unexpected and is attributed to the solid inorganic co-catalyst not "seeing" the beta zeolite in the polymer melt which allows all of the composite catalyst components to work without interference to each other.

A selection of the activated alumina containing composite catalysts were also evaluated at temperatures of 400° C. The compositions and their depolymerization half times at these elevated temperatures are shown in Table 4. As before, increasing amounts of activated alumina reduced the depolymerization half time and accelerated the reaction by 1.7 to 2.7 times, compared to a reaction without the activated alumina.

TABLE 4

Depolymerization half time at 400° C. for composite catalyst having activated alumina

| Polyolefin | Composite catalyst | | Depolymerization $t_{1/2}$ (min) |
| --- | --- | --- | --- |
| HDPE (g) | BZ (g) | Al$_2$O$_3$ (g) | 0.15 g of Cellulose* |
| 4.7 | 0 | 0 | 385 |
| 4.7 | 0.05 | 0 | 8 |
| 4.7 | 0.05 | 0.15 | 5 |
| 4.7 | 0.05 | 0.30 | 4 |
| 4.7 | 0.05 | 0.45 | 3 |
| 4.7 | 0.1 | 0 | 2 |
| 4.7 | 0.1 | 0.15 | 2 |
| 4.7 | 0.15 | 0 | 2 |
| 4.7 | 0.15 | 0.15 | 1 |
| 4.7 | 0 | 0.15 | 365 |

BZ = Beta Zeolite
* = ~3 wt. %

Thus, both Ca(OH)$_2$ and/or Al$_2$O$_3$ can be used to improve the depolymerization reaction by increasing the rate of depolymerization for polyolefins with cellulose present. $Al_2O_3$, in particular, showed that it can improve the reaction at a range of temperatures.

Example 3: H-USY Zeolite

Examples 1 and 2 focused on the use of various Beta and ZSM-5 zeolites for the composite catalyst. For this example, composite catalysts were prepared using various amounts of a different zeolite, H-USY, with CaO. The compositions and their depolymerization half times are shown in Table 5.

TABLE 5

Depolymerization half time at 400° C. for composite catalyst having CaO

| Poly-olefin | Composite catalyst | | Depolymerization | | |
|---|---|---|---|---|---|
| HDPE (g) | H-USY (SFG-1) (g) | CaO (g) | 0 g of Cellulose | 0.125 g of Cellulose* | k (acceleration factor) |
| | | | $t_{1/2}$ (min) | | |
| 5 | 0 | 0 | 365 | | |
| 4.875 | 0 | 0 | | 385 | 0.0018 (1.0) |
| 4.875 | 0 | 0.125 | 277 | | |
| 4.875 | 0.125 | 0 | 6 | | |
| 4.75 | 0 | 0.125 | | 330 | 0.0021 (1.2) |
| 4.75 | 0.125 | 0 | | 239 | 0.0029 (1.6) |
| 4.75 | 0.125 | 0.125 | 9 | | |
| 4.625 | 0.125 | 0.125 | | 204 | 0.0034 (1.9) |

* = ~2.5 wt. %

H-USY and CaO by themselves decreased the depolymerization half time when cellulose was present by a factor of 1.6 and 1.2, respectively. However, the combination of H-USY and CaO as a composite catalyst accelerated the depolymerization reaction by a factor of two, compared to the uncatalyzed reaction of HDPE with cellulose.

Example 4: Nylon

The composite catalysts performed well when a polyolefin was mixed with a high oxygen content polymer such as cellulose. This example evaluates the composite catalysts performance when Nylon 12, a nitrogen containing polymer, is added to the polyolefin-based feed. The polyolefin-based feed comprised 0.1 g of each of Nylon 12 (Sigma-Aldrich) and cellulose in LDPE (grade NA214, a LyondellBasell product).

The composite catalyst in this example comprised various amounts of ZSM-5 zeolite and a solid inorganic co-catalyst. As before, the various examples were processed using TGA as the depolymerization unit; however, the samples were heated under nitrogen at 10K/min to a depolymerization temperature of 400° C. and held for 1 hour. The samples were prepared by melt-compounding the LDPE, Nylon 12 and optionally cellulose with the composite catalyst in a HAAK MiniCTW compounder at 200° C. and 200 RPM for 5 minutes. Each composition and its depolymerization half time are shown in Tables 6-9.

TABLE 6

Depolymerization half time at 400° C. for a mixed feed of LDPE (4.8 g), Cellulose (1 g), and Nylon 12 (1 g).

| | Composite Catalyst | | |
|---|---|---|---|
| Comp. No. | ZSM-5-CBV3014H Zeolite (g) | $Zr(HPO_4)_2$ (g) | Depolymerization $t_{1/2}$ (min) |
| Comparative Composition 1* | none | none | 144 |
| Comparative Composition 2 | 0.125 | none | 151 |
| Comparative Composition 3 | none | 0.5 | 193 |
| Composition 1 | 0.125 | 0.25 | 38 |
| Composition 2 | 0.125 | 0.5 | 29 |
| Composition 3 | 0.25 | 0.25 | 32 |
| Composition 4 | 0.25 | 0.5 | 25 |

*Polymer feed contained 5 g of LDPE, and no Nylon 12 or cellulose

Comparative Composition 1 is LDPE by itself with no catalyst or non-polyolefin components. This composition has a depolymerization half time at 400° C. of 144 minutes. The rate constant (k) of this depolymerization was 0.0048. This is the baseline values for which the remaining samples in this example will be compared.

Comparative Composition 2 combines LDPE with 1 g of Cellulose and 1 g of Nylon 12, and have a ZSM-5 zeolite as the only catalyst. Without the solid inorganic co-catalyst, the ZSM-5 increased the depolymerization half time at 400° C. to 151 minutes. Comparative Example 3, which has $Zr(HPO_4)_2$ by itself, without the zeolite, increased the depolymerization half time to 193 minutes. Comparative Example 3 shows that both the Nylon 12 and Cellulose slow the degradation of LDPE and that $Zr(HPO_4)_2$ and the zeolite are both inactive.

The results shown in Table 6 are for composite catalysts combining the ZSM-5 with $Zr(HPO_4)_2$. However, the combination of ZSM-5 and $Zr(HPO_4)_2$ increased the rate constant by a factor of 5, thus reducing the depolymerization half time by at least 73%, to about 38 minutes (Composition 1).

Larger drops in depolymerization half time were seen as the concentration of the composite catalyst increased from 0.375 g to 0.75 g. Surprisingly, the biggest differences in depolymerization half time were observed when the amount of the $Zr(HPO_4)_2$ increased in the composite catalyst. The depolymerization half time dropped by 9 minutes when doubling the amount of $Zr(HPO_4)_2$ in Composition 2, as compared to Composition 1. However, the depolymerization half time dropped by 6 minutes when doubling the amount of ZSM-5 in Composition 3, as compared to Composition 1. This was surprising as $Zr(HPO_4)_2$ by itself in Comparative Example 3 increased the depolymerization half time by about 34% and was considered inactive. In contrast, the ZSM-5 by itself in Comparative Example 3 increased the depolymerization half time by about 5% and was considered active. Thus, an increase in $Zr(HPO_4)_2$ in the composite catalyst was not expected to be a driving force in decreasing the depolymerization half time. However, the results in Table 6 show that $Zr(HPO_4)_2$, which was inactive by itself at 0.5 grams, is able to significantly enhance the catalyst effect of the composite catalyst when combined with the ZMS-5. Thus, this shows that the $Zr(HPO_4)_2$ and a zeolite such as ZMS-5 have a synergistic effect when combined.

The results shown in Table 7 are for composite catalysts combining the ZSM-5 with $Al_2O_3$ and/or $Ca(OH)_2$.

TABLE 7

Depolymerization half time at 400° C. for a mixed feed of LDPE (4.8 g), Cellulose (1 g), and Nylon 12 (1 g).

| | Composite Catalyst | | | |
|---|---|---|---|---|
| Comp. No. | ZSM-5-CBV3014H Zeolite (g) | Co-Catalyst | Weight of Co-catalyst (g) | Depolymerization $t_{1/2}$ (min) |
| Comparative Composition 1* | none | none | none | 144 |
| Comparative Composition 2 | 0.125 | none | none | 151 |
| Composition 6 | 0.125 | $Al_2O_3$ | 0.25 | 112 |
| Composition 7 | 0.125 | $Al_2O_3$ | 0.5 | 61 |
| Composition 8 | 0.25 | $Al_2O_3$ | 0.5 | 37 |
| Composition 9 | 0.125 | $Ca(OH)_2$ | 0.25 | 99 |
| Composition 10 | 0.125 | $Ca(OH)_2$ | 0.5 | 72 |
| Composition 11 | 0.25 | $Ca(OH)_2$ | 0.5 | 37 |
| Composition 12 | 0.125 | $Ca(OH)_2$ + $Al_2O_3$ | 0.5 | 67 |
| Composition 13 | 0.25 | $Ca(OH)_2$ + $Al_2O_3$ | 0.5 | 36 |

*Polymer feed contained 5 g of LDPE, and no Nylon 12 or cellulose

The solid inorganic co-catalyst both helped to reduce the depolymerization half time, however the reductions when using $Ca(OH)_2$ in Compositions 9-10 were slightly larger than Compositions 6-7 with $Al_2O_3$. This trend is the opposite of that observed in Example 2 for a HDPE/Cellulose feed. It is believed that the addition of Nylon 12, not the change from a HDPE to a LDPE, is responsible for the $Ca(OH)_2$ being slightly better. Increasing the amount of ZSM-5, however, negated any differences between these two solid inorganic co-catalysts, as both Composition 8 and Composition 11 had a depolymerization half time of 37 minutes.

As shown in Table 7, the largest improvements in depolymerization half time were observed when the composite catalyst contained 0.25 grams of the ZSM-5 and 0.5 grams of the solid inorganic co-catalyst, which is about 15 wt. % of Compositions 8, 11, 13. These results show that, while the combination of a zeolite and solid inorganic co-catalyst can improve the depolymerization reaction, the amounts of both components can be varied and customized for each polyolefin feed. Further, the decreases in the depolymerization half time will translate to shorter residence times in a large scale, industrial reactor.

The catalyst composites performed well with polyolefin feeds having cellulose only as well as nylon and cellulose. As such, a series of compositions having nylon mixed with the LDPE were prepared and depolymerized. These compositions and their depolymerization results are shown in Tables 8-9.

TABLE 8

Depolymerization half time at 400° C. for a mixed feed of LDPE and Nylon 6.

| | Feed | | Composite Catalyst | | |
|---|---|---|---|---|---|
| Comp. No. | LDPE (g) | Nylon 6 (g) | ZSM-5-CBV3014H Zeolite (g) | Co-catalyst | Weight of Co-catalyst (g) | Depolymerization $t_{1/2}$ (min) |
| Comparative Comp. 1 | 5 | none | none | none | | 144 |
| 14 | 4.5 | 0.5 | none | none | | 161 |
| 15 | 4.5 | 0.5 | 0.125 | none | | 161 |
| 16 | 4.5 | 0.5 | none | $Ca(OH)_2$ | 0.5 | 139 |
| 17 | 4.5 | 0.5 | 0.125 | $Ca(OH)_2$ | 0.5 | 83 |

Table 8 displays a series of feeds having 0.5 g of Nylon 6. Adding the Nylon 6 in Composition 14 increased the depolymerization half-time from 144 minutes (Comparative Composition 1) to 161 minutes. The addition of a zeolite in Composition 15 did not improve the depolymerization half time of the LDPE/Nylon 6 feed. In contrast, the addition of $Ca(OH)_2$ decreased the depolymerization half time to 139 minutes, which is less than that observed in Comparative Composition 1. The results for composition 17, however, show the synergistic effect of the combination of a zeolite with $Ca(OH)_2$. The composite catalyst in composition 17 reduced the depolymerization half time by about 42%, to 83 minutes.

Table 9 displays a series of feeds having various amounts of Nylon 12. Unlike the effects of Nylon 6 in Composition 14, the addition of 0.5 g of Nylon 12 decreased the depolymerization half-time from 144 minutes (Comparative Composition 18) to 107 minutes. The addition of a zeolite in Composition 19 slightly reduced the depolymerization half-time to 103 minutes. The addition of $Ca(OH)_2$ in Composition 20 increased the depolymerization half-time to 124 minutes. However, the combination of both a zeolite and $Ca(OH)_2$ in Composition 21 increased the depolymerization half-time even more to 131 minutes. From these results, it appears as the amount of the non-polyolefin component increases, e.g. 0.5 g of Nylon, a higher loading of composite catalyst is required to compensate for the reaction rate loss.

TABLE 9

Depolymerization half time at 400° C. for a mixed feed of LDPE and Nylon 12.

| | Feed | | Composite Catalyst | | |
|---|---|---|---|---|---|
| Comp. No. | LDPE (g) | Nylon 12 (g) | ZSM-5-CBV3014H Zeolite (g) | Co-catalyst | Weight of Co-catalyst (g) | Depolymerization $t_{1/2}$ (min) |
| Comparative Comp. 1 | 5 | none | none | none | | 144 |
| 18 | 4.5 | 0.5 | none | none | | 107 |
| 19 | 4.5 | 0.5 | 0.125 | none | | 103 |
| 20 | 4.5 | 0.5 | none | $Ca(OH)_2$ | 0.25 | 124 |
| 21 | 4.5 | 0.5 | 0.125 | $Ca(OH)_2$ | 0.25 | 131 |
| 22 | 4.9 | 0.1 | 0.125 | none | | 54 |
| 23 | 4.9 | 0.1 | 0.125 | $Ca(OH)_2$ | 0.25 | 100 |
| 24 | 4.9 | 0.1 | 0.25 | none | | 25 |
| 25 | 4.9 | 0.1 | 0.25 | $Ca(OH)_2$ | 0.25 | 46 |
| 26 | 4.9 | 0.1 | none | $Al_2O_3$ | 0.25 | 147 |
| 27 | 4.9 | 0.1 | 0.25 | $Al_2O_3$ | 0.25 | 15 |
| 28 | 4.9 | 0.1 | 0.25 | $Al_2O_3$ | 0.5 | 17 |

Compositions 22-28 used a smaller amount of Nylon 12. All of the compositions using Ca(OH)$_2$ as a co-catalyst were able to improve the depolymerization reaction by decreasing the half time.

Further, increasing the amount of zeolite in the composite catalyst showed further improvements. For example, Composition 25 with 0.25 g of zeolite had a depolymerization half time that was 54 minutes less than Composition 23, which had 0.125 g of zeolite. The same amount of Ca(OH)$_2$ was used in both compositions.

Compositions 26-28 have Al$_2$O$_3$ instead of Ca(OH)$_2$ as the solid inorganic co-catalyst. This co-catalyst had a more positive effect on the depolymerization reaction than Ca(OH)$_2$. This was unexpected as Composition 26, which did not have a zeolite, had a higher half time than Comparative Composition 1. However, when combined with a zeolite, Al$_2$O$_3$ had a synergistic effect that resulted in the depolymerization half time being reduced by at least 88%.

Example 5: Other Polymer Compositions

The composite catalysts performed well when a polyolefin was mixed with a high oxygen content polymer such as cellulose and a high nitrogen content polymer like Nylon 6 and 12. In this example, a series of feeds combining LDPE with a variety of polymers were depolymerized with a ZSM-5, Ca(OH)$_2$ and a composite catalyst comprising both ZSM-5 and Ca(OH)$_2$. The results are shown in Tables 10-15, and can be compared to the depolymerization half time of 144 minutes for a sample having only LDPE.

TABLE 10

Depolymerization half time at 400° C. for a LDPE/Polyurethane feed

| Feed | | Composite Catalyst | | |
| --- | --- | --- | --- | --- |
| LDPE (g) | Polyurethane (g) | ZSM-5-CBV3014H (g) | Ca(OH)$_2$ (g) | Depolymerization $t_{1/2}$ (min) |
| 4.5 | 0.5 | 0 | 0 | 128 |
| 4.5 | 0.5 | 0.125 | 0 | 116 |
| 4.5 | 0.5 | 0 | 0.25 | 158 |
| 4.5 | 0.5 | 0.125 | 0.25 | 68 |

The feed in Table 10 comprises polyurethane. The addition of just polyurethane improved the depolymerization reaction by 16 minutes. The composite catalyst decreased the depolymerization half time by about 47% compared to an uncatalyzed reaction, and by about 56% compared to a reaction with the Ca(OH)$_2$ only.

TABLE 11

Depolymerization half time at 400° C. for a LDPE/Ethylene vinyl alcohol (EvOH) feed

| Feed | | Composite Catalyst | | |
| --- | --- | --- | --- | --- |
| LDPE (g) | EVOH (g) | ZSM-5-CBV3014H (g) | Ca(OH)$_2$ (g) | Depolymerization $t_{1/2}$ (min) |
| 4.5 | 0.5 | 0 | 0 | 158 |
| 4.5 | 0.5 | 0.125 | 0 | 15 |
| 4.5 | 0.5 | 0 | 0.25 | 173 |
| 4.5 | 0.5 | 0.125 | 0.25 | 9 |

The feed in Table 11 comprises ethylene vinyl alcohol (EvOH). The composite catalyst decreased the depolymerization half time by about 94% compared to an uncatalyzed reaction.

TABLE 12

Depolymerization half time at 400° C. for a LDPE/Ethylene vinyl acetate (EVA) feed

| Feed | | Composite Catalyst | | |
| --- | --- | --- | --- | --- |
| LDPE (g) | EVA (g) | ZSM-5-CBV3014H (g) | Ca(OH)$_2$ (g) | Depolymerization $t_{1/2}$ (min) |
| 4.5 | 0.5 | 0 | 0 | 147 |
| 4.5 | 0.5 | 0.125 | 0 | 3 |
| 4.5 | 0.5 | 0 | 0.25 | 143 |
| 4.5 | 0.5 | 0.125 | 0.25 | 3 |

The feed in Table 12 comprises ethylene vinyl acetate (EVA). The composite catalyst decreased the depolymerization half time by about 98% compared to an uncatalyzed reaction. Surprisingly, this was the same amount of decrease for the composition using the ZSM-5 zeolite only.

TABLE 13

Depolymerization half time at 400° C. for a LDPE/Acrylate copolymer feed

| Feed | | Composite Catalyst | | |
| --- | --- | --- | --- | --- |
| LDPE (g) | Arylate (g) | ZSM-5-CBV3014H (g) | Ca(OH)$_2$ (g) | Depolymerization $t_{1/2}$ (min) |
| 4.5 | 0.5 | 0 | 0 | 122 |
| 4.5 | 0.5 | 0.125 | 0 | 16 |
| 4.5 | 0.5 | 0 | 0.25 | 124 |
| 4.5 | 0.5 | 0.125 | 0.25 | 13 |

The feed in Table 13 comprises an arylate copolymer. The addition of just arylate copolymer improved the depolymerization reaction by 22 minutes. The composite catalyst decreased the depolymerization half time by about 89% compared to an uncatalyzed reaction.

TABLE 14

Depolymerization half time at 400° C. for a LDPE/Poly(ethylene terephthalate) (PET) feed

| Feed | | Composite Catalyst | | |
| --- | --- | --- | --- | --- |
| LDPE (g) | PET (g) | ZSM-5-CBV3014H (g) | Ca(OH)$_2$ (g) | Depolymerization $t_{1/2}$ (min) |
| 4.75 | 0.25 | 0 | 0 | 139 |
| 4.5 | 0.5 | 0 | 0 | 139 |
| 4 | 1 | 0 | 0 | 144 |
| 4.5 | 0.5 | 0.125 | 0 | 45 |
| 4.5 | 0.5 | 0.125 | 0.25 | 2 |

The feed in Table 14 comprises PET. The addition of just PET improved the depolymerization reaction by 5 minutes. Four different uncatalyzed reactions were performed. The composite catalyst decreased the depolymerization half time by about 98.5% compared to an uncatalyzed reaction with the same feed.

TABLE 15

Depolymerization half time at 400° C.
for a LDPE/Poly(butyl methacrylate) feed

| Feed | | Composite Catalyst | | |
|---|---|---|---|---|
| LDPE (g) | Poly(butyl methacrylate) (g) | ZSM-5-CBV3014H (g) | Ca(OH)$_2$ (g) | Depolymerization t$_{1/2}$ (min) |
| 4.5 | 0.5 | 0 | 0 | 119 |
| 4.5 | 0.5 | 0.125 | 0 | 31 |
| 4.5 | 0.5 | 0 | 0.25 | 124 |
| 4.5 | 0.5 | 0.125 | 0.25 | 33 |

The feed in Table 15 comprises poly(butyl methacrylate). The addition of just poly(butyl methacrylate) improved the depolymerization reaction by 25 minutes. The composite catalyst decreased the depolymerization half time by about 72% compared to an uncatalyzed reaction with the same feed.

In all of the samples in Example 5, the use of a composite catalyst comprising a ZSM-5 zeolite and Ca(OH)$_2$ decreased the depolymerization half time by more than at least about 50%. With the exception of the feed with poly(butyl methacrylate) and the plastic water bottles, the composite catalyst had the same performance as or outperformed the zeolite by itself.

Example 6: Post Consumer Wastes

This example focused on the synergistic effect of the combination of a zeolite with a solid inorganic co-catalyst for the depolymerization of polyolefin-based post-consumer waste streams.

Pelletized polyolefins: The first post-consumer waste stream evaluated was obtained from sorted post-consumer waste streams mostly consisting of polyolefins (>90% HDPE content, SUEZ Corp.) that was then pelletized. As before, the depolymerization unit was a TGA instrument. Uniform samples were prepared by melt-compounding 5 g of the pelletized post-consumer waste stream with various catalysts in a HAAK MiniCTW compounder at 200° C. and 200 RPM for 5 minutes. The uniform samples were heated under nitrogen at 10K/min to a depolymerization temperature of 400° C. in a Mettler Toledo TGA/DSC 3+ (Mettler Toledo, Columbus, OH) and held for 1 hour.

Four different catalysts were used to depolymerize the pelletized post-consumer waste stream. The first catalyst was 0.25 g of a Beta zeolite only, which was used in Composition 15. The second catalyst was 0.25 g of an amorphous AlSiOx zeolite only, which was used in Composition 16. The third catalyst was ZSM-5 zeolite only, which was used in varying amounts in Compositions 17-18. The final catalysts were 0.375 g of a composite catalyst that combined 0.25 g of a co-catalyst with 0.125 g of the ZSM-5 zeolite. The composite catalysts were used in Compositions 19-21. The compositions and depolymerization half times are shown in Table 17.

TABLE 1

Depolymerization results for pelletized
post-consumer waste (5 g) at 400° C.

| Composition No. | Zeolite | (g) | Co-catalyst | (g) | t$_{1/2}$ (min) |
|---|---|---|---|---|---|
| Comparative Comp. 17 | none | none | none | none | 239 |
| 15 | Beta CP811E-75 | 0.25 | none | none | 1 |
| 16 | Siral ®40 (amorph AlSiOx) | 0.25 | none | none | 26 |
| 17 | CBV3014H (ZSM-5) | 0.25 | none | none | 7 |
| 18 | CBV3014H (ZSM-5) | 0.125 | none | none | 22 |
| 19 | CBV3014H (ZSM-5) | 0.125 | Ca(OH)$_2$ | 0.25 | 11 |
| 20 | CBV3014H (ZSM-5) | 0.125 | Al$_2$O$_3$ | 0.25 | 10 |
| 21 | CBV3014H (ZSM-5) | 0.125 | Zr(HPO$_4$)$_2$ | 0.25 | 6 |

Comparative Example 17, which is the un-catalyzed depolymerization had a depolymerization half time of 239 min. The depolymerization half times decreased with the addition of a catalyst, either as a zeolite or composite catalyst. For the zeolite-only mixtures, 0.25 g of the zeolite, which is 5% of the mixture, produced the quickest depolymerization half times. Comparing Composition 17 to 18, the decrease in the amount of ZSM-5 more than tripled the depolymerization half time.

The composite catalyst used the same amount of zeolite as the mixture in Composition 18. The observed depolymerization half times decreased by over half when a composite catalyst, regardless of which co-catalyst was used in Compositions 19-20, as compared to the use of 0.125 g of ZSM-5 zeolite only in Composition 18. Thus, this shows the synergistic effects that the co-catalysts have when combined with a zeolite. It is also noted that the use of Zr(HPO$_4$)$_2$ with ZSM-5 showed an improvement over Composition 18, which used a larger amount of ZSM-5, again showing the synergistic effects that the co-catalysts have with the zeolites.

Shredded municipal polyolefins: The second post-consumer plastic stream evaluated was a shredded municipal polyolefin waste stream (MPO) having a combination of PE and PP (~1:1: ratio). As before, the depolymerization unit was a TGA instrument. Uniform samples were prepared by melt-compounding 5 g of the MPO stream with 0.125-0.25 g of a zeolite, or 0.375-0.5 g of a composite catalyst, in a HAAK MiniCTW compounder at 200° C. and 200 RPM for 5 minutes. The composite catalyst combined 0.25 g of a co-catalyst with either 0.125 g or 0.25 g of a zeolite.

The uniform samples were heated under nitrogen at 10K/min to a depolymerization temperature of 400° C. in a Mettler Toledo TGA/DSC 3+ (Mettler Toledo, Columbus, OH) and held for 1 hour. The depolymerization half times are shown in Table 18.

TABLE 18

Depolymerization results for MPO (5 g) at 400° C.

| Composition No. | Zeolite | (g) | Co-catalyst | (g) | t$_{1/2}$ (min) |
|---|---|---|---|---|---|
| Comparative Comp. 18 | none | none | none | none | 204 |
| 22 | ZSM-5 (CBV3014H) | 0.125 | none | none | 36 |
| 23 | ZSM-5 (CBV3014H) | 0.125 | Ca(OH)$_2$ | 0.25 | 32 |
| 24 | ZSM-5 (CBV3014H) | 0.125 | Zr(HPO$_4$)$_2$ | 0.25 | 30 |
| 25 | beta (CP811E-75) | 0.125 | none | none | 20 |
| 26 | beta (CP811E-75) | 0.125 | Ca(OH)$_2$ | 0.25 | 5 |
| 27 | beta (CP811E-75) | 0.125 | Zr(HPO$_4$)$_2$ | 0.25 | 5 |

TABLE 18-continued

Depolymerization results for MPO (5 g) at 400° C.

| Composition No. | Zeolite | (g) | Co-catalyst | (g) | $t_{1/2}$ (min) |
|---|---|---|---|---|---|
| 28 | H-USY (SFG-1) | 0.25 | none | none | 19 |
| 29 | H-USY (SFG-1) | 0.25 | Ca(OH)$_2$ | 0.25 | 10 |
| 30 | H-USY (SFG-1) | 0.25 | Zr(HPO$_4$)$_2$ | 0.25 | 5 |

Comparative Composition 18 is the MPO without a catalyst and provides as the baseline depolymerization half time of 204 minutes. As with the pelletized polyolefins, the depolymerization half times for the MPO decreased with the addition of a catalyst. The observed depolymerization half times also decreased by at least 10% when a composite catalyst, regardless of which co-catalyst was used, was used as compared to the use of only the zeolite. In fact, adding a solid inorganic co-catalyst to the Beta zeolite in Compositions 26 and 27 decreased the half-time by 75% compared to Composition 25. Thus, this shows how much more effective the composite catalyst of the present disclosure is compared to either components on their own.

Multilayer Packaging Film: Table 19 displays the results for the depolymerization for a post-consumer multilayer packaging film waste, wherein the composite catalyst combined various zeolites with one of Al$_2$O$_3$, Ca(OH)$_2$, Ba(OH)$_2$, Mg(OH)$_2$, or Sr(OH)$_2$. The multilayer film mix included polyolefinic packaging film, which has adhesive tie-layers and barrier films incorporated therein. These adhesive tie-layers and barrier films are formed from non-polyolefin polymers such as EVA, EVOH, and polyamines.

The addition of Ca(OH)$_2$ to each of the zeolites in Table 19 resulted in a decrease the depolymerization half time. In fact, Ca(OH)$_2$ by itself was able to reduce the half time from 330 (Comparative Comp. 19) to 248 min (Composition 31). Unexpectedly, however, increasing the amount of Ca(OH)$_2$ did not result in large changes in the depolymerization half time. Composition 39 had twice the amount of Ca(OH)$_2$ as Composition 38, but only reduced the half time by another two minutes (~5%). See also Compositions 42 and 43, wherein doubling the weight of Ca(OH)$_2$ actually increased the half time by about 70%. However, this difference in half time could also be attributed to the ratio of components, where Composition 42 is a 1:1 ratio and Composition 43 is a 1:4 ratio (zeolite:Ca(OH)$_2$). Regardless, for this particular feed stream, only 5 wt. % of Ca(OH)$_2$, in addition to the zeolite, was needed to see positive effects.

The addition of Mg(OH)$_2$ was also able to decrease the depolymerization half time compared to a zeolite-only catalyst. In contrast, the addition of Ba(OH)$_2$, and Sr(OH)$_2$ increased the depolymerization half time, thus slowing the rate of depolymerization for this particularly waste feed. However, their activity may surpass that of Ca(OH)$_2$, and Mg(OH)$_2$ for other types of feeds, or with the use of different particle sizes.

Table 19 also displays the use of Al$_2$O$_3$ with two different ZSM-5 zeolites in Composition 33 and 41. However, only Composition 33 showed an improvement in depolymerization half time compared to the zeolite-only composition, further showing how different combinations of the same components may not be as effective for the same feed stream.

TABLE 19

Depolymerization of post-consumer multilayer packing film waste (5 grams) at 400° C.

| Composition No. | Zeolite Material | Weight (g) | Co-catalyst Material | Weight (g) | $t_{1/2}$ (min) |
|---|---|---|---|---|---|
| Comparative Comp. 19 | none | none | none | none | 330 |
| 31 | none | none | Ca(OH)$_2$ | 0.25 | 248 |
| 32 | CBV2314 (ZSM5 | 0.125 | none | none | 158 |
| 33 | Zeolyst) | 0.125 | Al$_2$O$_3$ | 0.25 | 95 |
| 34 |  | 0.125 | Ca(OH)$_2$ | 0.25 | 71 |
| 35 | CBV3014H (ZSM5 | 0.125 | none | none | 92 |
| 36 | Zeolyst) | 0.125 | Ca(OH)$_2$ | 0.25 | 56 |
| 37 | CBV8014 (ZSM5 | 0.125 | none | none | 330 |
| 38 | Zeolyst) | 0.25 | Ca(OH)$_2$ | 0.25 | 38 |
| 39 |  | 0.25 | Ca(OH)$_2$ | 0.5 | 36 |
| 40 | CBV3024E (ZSM5 | 0.125 | none | none | 105 |
| 41 | Zeolyst) | 0.125 | Al$_2$O$_3$ | 0.25 | 110 |
| 42 |  | 0.125 | Ca(OH)$_2$ | 0.25 | 44 |
| 43 |  | 0.125 | Ca(OH)$_2$ | 0.5 | 75 |
| 44 |  | 0.125 | Mg(OH)$_2$ | 0.25 | 78 |
| 45 |  | 0.125 | Sr(OH)$_2$ | 0.25 | 315 |
| 46 |  | 0.125 | Ba(OH)$_2$ | 0.25 | 365 |

These decreases in the depolymerization half time that are experienced by each of the post-consumer waste streams in Example 6 will translate to shorter residence times in a large scale, industrial reactor. Further, the results show the synergistic effects that the solid inorganic co-catalysts will have when combined with a zeolite even when a non-polyolefin component is not present in the feed stream. These results also show that the presently disclosed composite catalysts are applicable for depolymerizing real-world feed stream obtained from post-consumer sources.

It has been shown by the above examples that the presently described catalyst compositions of a zeolite and at least one solid inorganic co-catalyst were able to catalyze the depolymerization of polyolefin-based streams with an improved energy efficiency (i.e. more cost effective) when compared to methods without the use of the co-catalyst. Improvements in the depolymerization reaction were observed even when the polyolefin-based streams contained other polymers that are able to suppress the zeolite's catalytic abilities, or when the feed streams were obtained from post-consumer sources.

Example 7: Zeolite/Supported Zr(HPO$_4$)$_2$ Catalyst System

Uniform mixed polyolefin-based samples were prepared by melt compounding 2.5 g high density polyethylene (HDPE; grade ACP9255, a LyondellBasell product), 2.5 g polypropylene (MOPLEN HP522H, a LyondellBasell product), 0.25 g Nylon 6 (Sigma-Aldrich), 0.125 g H-USY catalyst, and the specified quantity of the additive, as indicated in Table 20 below, in a HAAK MiniCTW compounder at 200° C. and 200 RPM for 5 minutes.

The uniform samples were heated under nitrogen at 10K/min to a depolymerization temperature of 400° C. in a Mettler Toledo TGA/DSC 3+ (Mettler Toledo, Columbus, OH) and held for 1 hour.

The compositions and their depolymerization half times are shown in Tables 20 and 21. As shown therein, additives based on supported Zr(HPO$_4$)$_2$ prepared by reacting ZrOCl$_2$ with phosphoric acid or ammonium phosphates in the presence of a support were efficacious in depolymerizing the samples.

Manufacture of Additives: The $SiO_2$ supported ZrP additives were formed by an incipient wetness technique. For example, a silica was impregnated with a $ZrOCl_2$ (Sigma-Aldrich) solution in $H_2O$ and the resulting mix was dried 2 hours at 110° C. The resulting powder was impregnated with various amounts of $H_2PO_4$ solution (Sigma-Aldrich) to result in free-flowing powders dried for 2 hours at 110° C. The bentonite (F-20X, Engineered Clays Co.) supported ZrP additives were similarly formed by an reacting $ZrOCl_2$ with Phosphor containing reagents. For example, a bentonite sample was kneaded/mixed with a $ZrOCl_2$ solution in 30 ml $H_2O$ and the resulting paste was dried 2 h at 110° C. The resulting powder was thereafter kneaded/mixed with a various amounts of $H_2PO_4$ solutions or ammonium phosphate (mono or dibasic; Sigma-Aldrich) to result in pastes dried for 2 h at 110° C.

TABLE 20

Reagents used to prepare supported $Zr(HPO_4)_2$ additive samples

| Additive | Support | ZrOCl2*8 H2O | 80% H2PO4 | NH4 Phosphate |
|---|---|---|---|---|
| Si10Zr1P1-1 | SiO2 - 3 g | 0.3 g in 6 ml H2O | 0.22 g | none |
| Si10Zr1P2-1 | SiO2 - 3 g | 0.3 g in 6 ml H2O | 0.34 g | none |
| Si10Zr1P3-1 | SiO2 - 3 g | 0.3 g in 6 ml H2O | 0.65 g | none |
| B10Zr1P2-2 | Bentonite - 2 g | 0.2 g in 2 ml H2O | 0.34 g | none |
| B10Zr1P3-2 | Bentonite - 2 g | 0.2 g in 2 ml H2O | 0.45 g | none |
| B10Zr1MNP2-1 | Bentonite - 2 g | 0.2 g in 2 ml H2O | none | $(NH_4)H_2PO_4$ - 0.276 g |
| B10Zr1DNP2-1 | Bentonite - 2 g | 0.2 g in 2 ml H2O | none | $(NH_4)_2HPO_4$ - 0.317 g |

TABLE 21

Depolymerization of post-consumer waste (HDPE + PP, 1:1 ratio, 5 grams with Nylon 6, 0.25 g) at 400° C.

| Composition No. | Catalyst Material | Weight (g) | Additive Material | Weight (g) | $t_{1/2}$ (min) |
|---|---|---|---|---|---|
| Comparative Comp. 20 | H-USY (SFG-1) | 0.125 | None | None | 65.4 |
| 47 | H-USY (SFG-1) | 0.125 | Si10Zr1P1-1 | 0.25 | 28.9 |
| 48 | H-USY (SFG-1) | 0.125 | Si10Zr1P2-1 | 0.25 | 20.4 |
| 49 | H-USY (SFG-1) | 0.125 | $Zr(HPO_4)_2$ amorph | 0.1 | 11.4 |
| 50 | H-USY (SFG-1) | 0.125 | $Zr(HPO_4)_2$ amorph | 0.25 | 4.2 |
| 51 | H-USY (SFG-1) | 0.125 | Si10Zr1P1-1 | 0.25 | 28.9 |
| 52 | H-USY (SFG-1) | 0.125 | Si10Zr1P2-1 | 0.25 | 20.4 |
| 53 | H-USY (SFG-1) | 0.125 | Si10Zr1P3-1 | 0.25 | 10.0 |
| 54 | H-USY (SFG-1) | 0.125 | B10Zr1P2-1 | 0.25 | 5.8 |
| 55 | H-USY (SFG-1) | 0.125 | B10Zr1P3-1 | 0.25 | 5.3 |
| 56 | H-USY (SFG-1) | 0.125 | B10Zr1MNP2-1 | 0.25 | 6.6 |
| 57 | H-USY (SFG-1) | 0.125 | B10Zr1DNP2-1 | 0.25 | 5.7 |

It has been shown by the above examples that the presently described catalyst compositions of a zeolite and at least one zirconium-based additive were able to catalyze the depolymerization of polyolefin-based streams quicker than compared to methods without the use of the additive.

Example 8: Zeolyte/ZrHP Catalyst System 1

The following experimental steps have been carried out in a depolymerization apparatus comprising a depolymerization reactor having a mechanically agitated, jacketed reactor provided with an inlet for the plastic waste feed from an extruder, an inlet for the depolymerization catalyst feed and an outlet for the generated gases. Gases withdrawn from the reactor are conveyed to a condensation unit from which an incondensable gas and a pyrolytic oil are obtained. Thermocouples are positioned into the reactor to monitor and record the temperatures.

A plastic waste feedstock comprising 97 wt % polyolefin content with the remainder comprising traces of other common polymers (e.g., PET, PS, PA, and PU) plus inorganic contaminants was used for Example 8. The plastic waste feedstock was homogenized and pelletized before the loading in a hopper to feed the extruder. The extruder operated at a temperature of 290° C. and discharged continuously into the depolymerization reactor at 4 kg/h.

The depolymerization reactor was operated at a pressure of 4 barg and at temperature of about 400° C. Catalyst was continuously injected into the reactor in the form of a suspension in white oil with a syringe system similar to the system disclosed in WO2008/022900, incorporated herein by reference. The total depolymerization time was about 3 hours. At the conclusion of the depolymerization period the reactor was permitted to cool down and opened for cleaning.

The gaseous phase generated in the reactor was sent to a condensation unit formed by a cooling/scrubber column working at a 25° C. The selected cooling temperature allows the heavy hydrocarbons being condensed and the very light hydrocarbons being released as gaseous stream. The gaseous stream is conveyed to vent. The condensed oil was analyzed via GC-FID.

Due to the very high number of compounds, the result of the analysis has been reported by grouping the resulting compounds according to their retention time using specific hydrocarbons as internal retention time references.

Comparative Example 21: Evaluation of H-USY Zeolite without Additive

In the process set-up described under Example 8, a sample of H-USY Zeolite type (CBV 400-CAS number 1318-02-1, Zeolyst International) was tested. The catalyst was fed into the reactor in such an amount to provide a ratio of 3 wt. % with respect to the reactive phase mass.

The reactor was operated at 4 barg and an internal temperature recorded of 403° C.

Results in terms of product production (with respect to the feedstock) are reported in Table 22 accompanied by the GC-FID analytical report made on the sample of oil produced. Residual content was calculated excluding the component coming from inert feeding (i.e., the real plastic waste).

Inventive Example 58: Evaluation of Catalyst System (H-USY+Zirconium(IV) Hydrogen Phosphate)

An experimental trial was conducted as described for Comparative Example 21 with the difference that a slurry of white oil was prepared and fed to the reactor (1) containing a 1:1 by wt. % mixture of H-USY Zeolite type (CBV 400, CAS No. 1318-02-1, available from Zeolyst International) and zirconium(IV) hydrogen phosphate (CAS No. 13772-29-7, available from Merck). As used herein, "ZrHP" refers to zirconium(IV) hydrogen phosphate.

The solid catalyst mixture comprised 4 wt % of the combined solid catalyst mixture (2 wt % of HY-zeolite+2 wt % of ZrHP) and the reactive phase mass. Temperature was maintained at 407° C. and pressure was regulated at 4 barg. The results of the experimental trial are presented in Table 22 as Inventive Example 58.

Residual content was calculated excluding the component coming from inert feeding (i.e., the real plastic waste).

raised to 450° C. The pyrolysis process took place for 2 hours (maximum), the oil recovered and subsequently analyzed.

Comparative Example 22: Evaluation of H-USY Zeolite without Additive

Using the experimental set-up described under Example 9, a sample of H-USY zeolite type (CBV 400, CAS No. 1318-02-1, available Zeolyst International) was tested. The catalyst was fed into the reactor so as to comprise 2.5 wt % of the combined mass of the catalyst and feedstock.

Results in terms of product production (with respect to the feedstock) are reported in Table 23 as well as the GC-FID analytical report made on the sample of oil produced. Residual content was calculated excluding the component coming from inert feeding (i.e., the real plastic waste). Onset temperature (T onset) shows the temperature at which the first drop of oil is collected into the first condenser.

Inventive Example 59: Combined System (H-USY+Zirconium(IV) Hydrogen Phosphate)

An experimental trial was conducted as described in Comparative Example 22 with the difference that ZrHP was incorporated into the catalyst material. The solid catalyst mixture of Inventive Example 59 comprised 5 wt % of the combined solid catalyst mixture (2.5 wt % of H-USY+2.5 wt % of ZrHP) and the reactive phase mass. Results of the experimental trial are presented in Table 23 for Inventive Example 59.

TABLE 22

| Ex | Catalyst | Residual wt % | Oil Recovery wt % | Gas Recovery wt % | BP < 98° C. | 98° C. < BP < 203° C. | 203° C. < BP < 365° C. | 365° C. < BP < 434° C. | BP > 434° C. |
|---|---|---|---|---|---|---|---|---|---|
| Comp. 21 | H-USY | 23 | 58 | 19 | 1 | 42 | 50 | 4 | 3 |
| Inv. 58 | H-USY + ZrHP | 14 | 64 | 22 | 2 | 36 | 60 | 2 | 0 |

Inventive Example 58 demonstrated a lower residual compared to Comparative Example 21 indicating higher catalytic activity. The recovered oil of Inventive Example 58 did not contain any hydrocarbons with a boiling point higher than 434° C. Comparative Example 21 contained 3 wt % hydrocarbons having a boiling point above 434° C. Additionally, the fraction of recovered oil with a boiling point between 365° C. and 434° C. in Inventive Example 58 was 2 wt % in contrast to the 4 wt % of Comparative Example 21.

Example 9: Zeolyte/ZrHP Catalyst System 2

Thirty grams (30 g) of the same plastic waste feedstock and prepared as described in Example 8 was loaded in a 500 ml round glass reactor having three necks equipped with thermocouple and nitrogen inlet. The solid catalyst was then introduced in the specified amount into the glass reactor. Two glass condenser were connected in series and maintained at 110° C. and −8° C., respectively, using an oil bath (Cryostat Julabo). The reactor was placed in an electrically heated system (i.e., mantle bath) and the temperature was Residual content was calculated excluding the component coming from inert feeding (i.e., the real plastic waste). The residual content for Inventive Example 59 is comparable to that of Comparative Example 22; however, Inventive Example 59 produced a higher quantity of lighter compounds compared to Comparative Example 22 indicating a more pyrolyzed product resulting from increased catalytic activity. For example, the fractions of oil for Inventive Example 59 below 98° C. and between 98° C. and 203° C. of 25 wt % and 57 wt %, respectively, are significantly higher than the comparable 17 wt % and 45 wt % of Comparative Example 22.

Comparative Example 23: ZrHP

An experimental trial was conducted in the experimental apparatus of Example 9 using thirty grams of the same plastic waste feedstock and prepared as described in Example 8. However, in this experiment, only zirconium (IV) hydrogen phosphate (CAS No. 13772-29-7, available from Merck) was added to the plastic waste feedstock. The ZrHP comprised 2.5 wt % of the combined ZrHP and reactive phase mass. Results of Comparative Example 23 are presented in Table 23.

TABLE 23

| Ex | Catalyst | Residual wt % | Oil Recovery wt % | Gas Recovery wt % | T onset ° C. | BP < 98° C. | 98° C. < BP < 203° C. | 203° C. < BP < 434° C. | BP > 434° C. |
|---|---|---|---|---|---|---|---|---|---|
| Comp. 22 | H-USY | 4 | 77 | 19 | 290 | 17 | 45 | 36 | 2 |
| Inv. 59 | H-USY + ZrHP | 7 | 72 | 21 | 250 | 25 | 57 | 18 | 0 |
| Comp. 23 | ZrHP | 22 | 60 | 18 | 285 | 0 | 27 | 70 | 3 |

Comparative Example 23 did not show activity as a depolymerization catalyst having left a very high residual content, 22 wt %, in the reactor and producing an oil comprising a high percentage, 70 wt %, of components with a boiling point in the 203° C. to 434° C. range.

What is claimed is:

1. A composite catalyst for depolymerizing polymers, comprising
   a. at least one zeolite; and,
   b. about 20 to about 90 wt. %, based on the total weight of the composite catalyst, of at least one solid inorganic co-catalyst, wherein the at least one solid inorganic co-catalyst comprises $Zr(HPO_4)_2$.

2. The composite catalyst of claim 1, wherein said at least one zeolite is chosen from a group consisting of Beta zeolite, Zeolite Socony Mobil-5 (ZSM-5), zeolite Y or ultra-stable Y or combinations thereof.

3. The composite catalyst of claim 1, wherein the at least one zeolite is a Beta zeolite.

4. The composite catalyst of claim 3, wherein the Beta zeolite is present in an amount from 20 to 50 wt. %, based on the total weight of the composite catalyst.

5. The composite catalyst of claim 3, wherein the composite catalyst comprises ZSM-5.

6. The composite catalyst of claim 1, wherein the composite catalyst comprises Beta zeolite and ZSM-5, and wherein the Beta zeolite and ZSM-5 is present in an amount ranging from 25 to 50 wt. %, based on the total weight of the composite catalyst.

7. The composite catalyst of claim 1, wherein the total amount of solid inorganic co-catalyst is 20 to 60 wt. % of the composite catalyst.

8. A method of depolymerizing polymers comprising:
   a. adding a polyolefin-based feed stream and a composite catalyst of claim 1 to a reactor heated to a temperature between about 200 and about 600° C.; and
   b. reacting said polyolefin-based feed stream with said composite catalyst to depolymerize said polyolefin-based feed stream.

9. The method of claim 8, wherein the composite catalyst is present in an amount of greater than 0 to about 20 wt. % of the polyolefin-based feed stream.

10. The method of claim 8, wherein said polyolefin-based feed stream is a low-density polyethylene, a high density polyethylene, a polypropylene, or a combination thereof.

11. The method of claim 8, wherein said polyolefin-based feed stream has up to 10% of at least one non-polyolefin component.

12. The method of claim 11, wherein said at least one non-polyolefin component is a polymer that has a high oxygen content, nitrogen-containing moieties, or both.

13. The method of claim 12, wherein said polymer is selected from a group consisting of: nylon polymers, cellulose, polyaramids, polyurethanes, and polyvinyl polymers.

14. The method of claim 13, wherein said polyolefin-based feed stream is post-consumer waste or post-industrial waste.

15. The method of claim 11, wherein said at least one non-polyolefin component is a pigment having at least one nitrogen atom.

16. The method of claim 8, wherein said polyolefin-based feed stream comprises both post-industrial waste and post-consumer waste.

17. A method of depolymerizing polymers comprising:
   a. adding a polyolefin-based feed stream and a composite catalyst of claim 1 to a reactor heated to a temperature between about 200 and about 600° C., wherein said polyolefin-based feed stream has up to 10 wt. % of a non-polyolefin component; and
   b. reacting said polyolefin-based feed stream with said composite catalyst to depolymerize said polyolefin-based feed stream.

\* \* \* \* \*